United States Patent Office 3,300,978
Patented Jan. 31, 1967

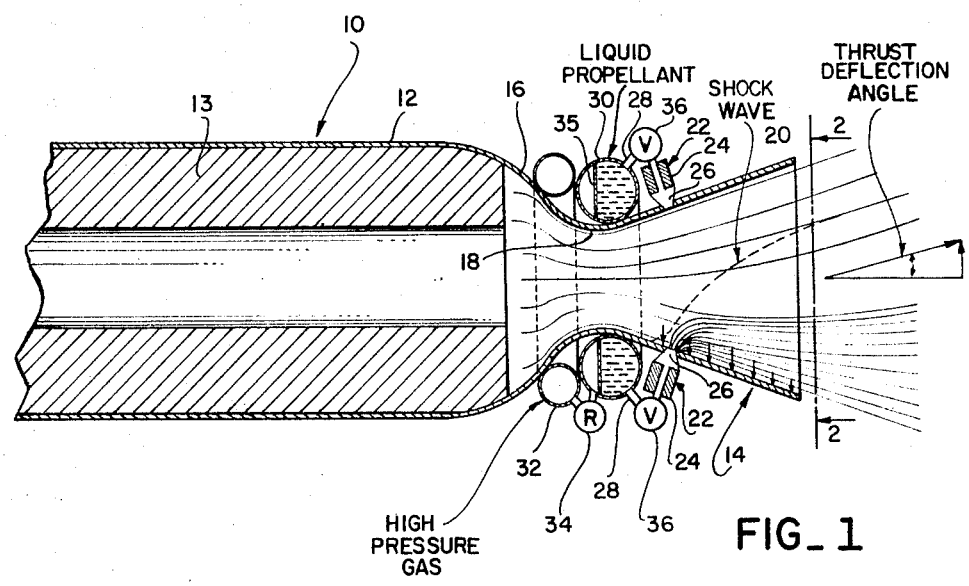

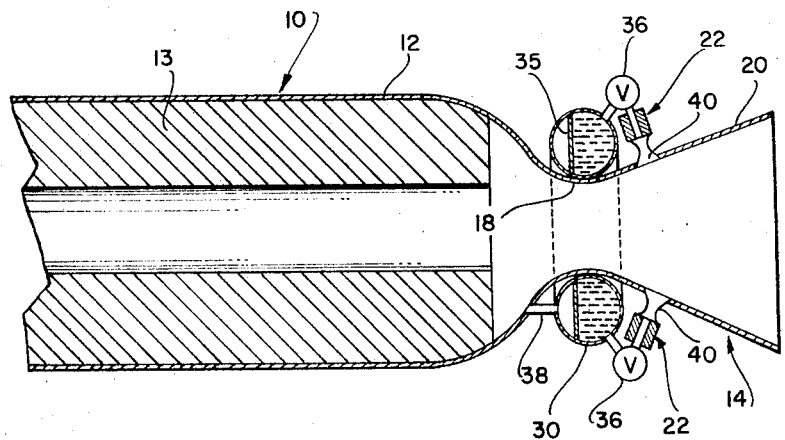
FIG_3
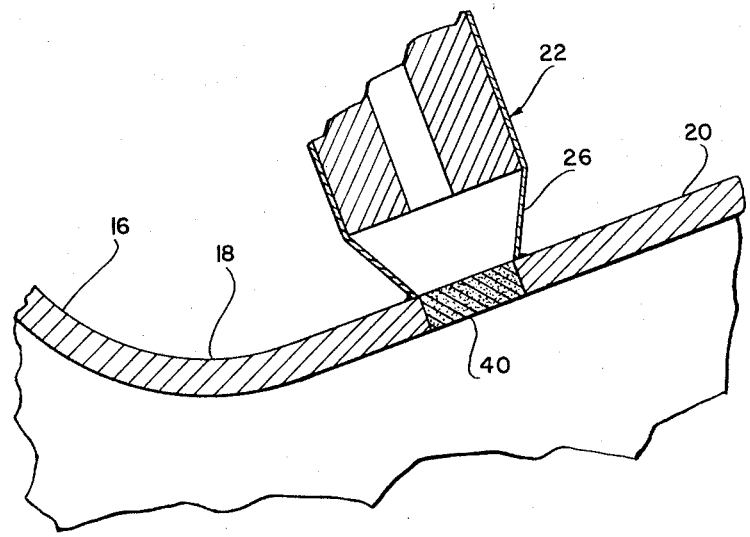
FIG_4

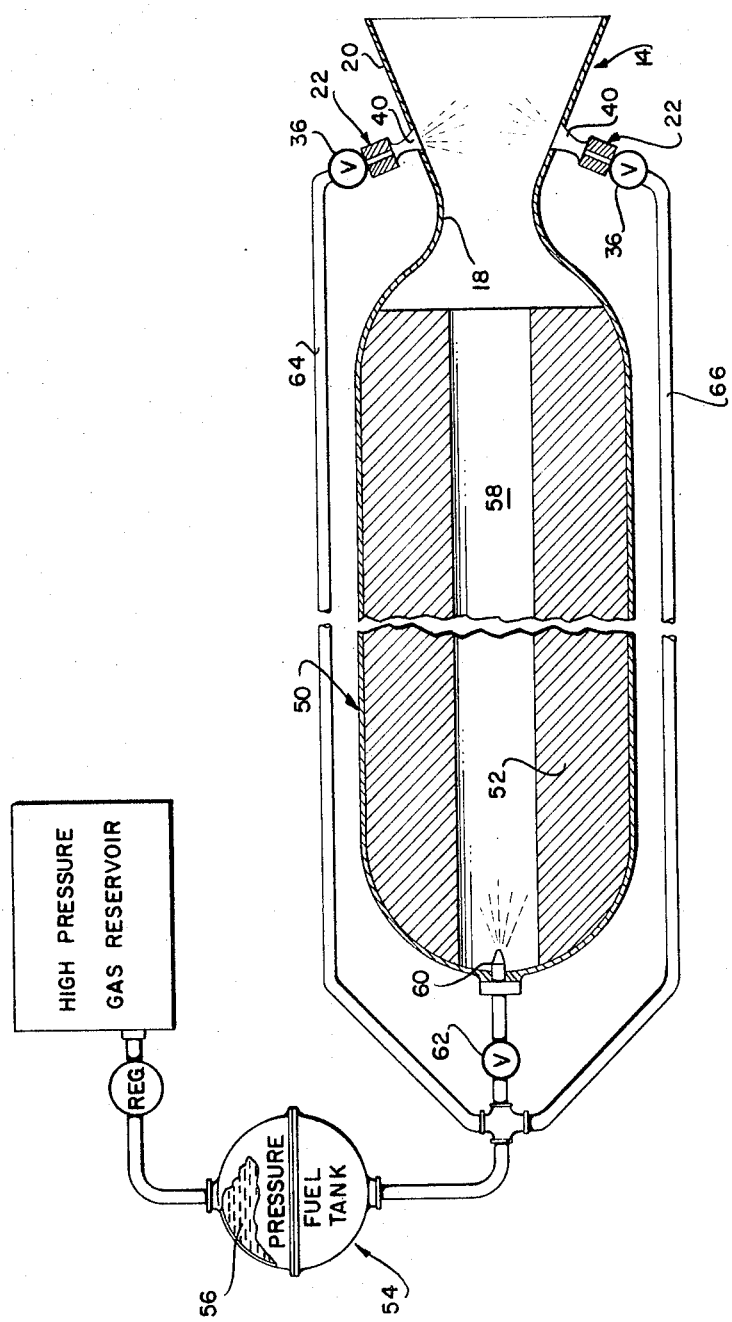

3,300,978
DIRECTIONAL CONTROL MEANS FOR ROCKET MOTOR

William Pennington, Los Angeles, Calif., assignor, by mesne assignments, to Lockheed Aircraft Corporation, Burbank, Calif., a corporation of California
Filed June 18, 1962, Ser. No. 203,070
2 Claims. (Cl. 60—231)

This invention relates to directional control means for a rocket motor, and more particularly to apparatus for obtaining thrust vector control by injection of a secondary fluid into the expansion nozzle of the rocket motor.

Previous proposals for obtaining thrust vector control have included the injection of such secondary fluids as vaporizable liquids, compressed air, and compressed nitrogen into the exhaust gases to deflect their flow. However, these fluids have been at considerably lower temperatures than the exhaust gases, and have necessitated greater mass flows for a given exhaust jet deflection than would be required had they been at approximately the same, or greater, temperature as the exhaust gases. The use of combustion chamber gas as the injection fluid has also been suggested, but the difficulty of valving such gas because of its high temperature and the requirement of a large, well-insulated conduit, which adds considerable weight to the motor, have prevented practical use of such hot gas for thrust vector control.

Accordingly, it is an object of the present invention to utilize a secondary fluid at a relatively high temperature and thereby reduce the mass flow necessary to obtain a given deflection of the exhaust jet.

It is another object of the invention to utilize means wherein the hot secondary fluid need not be directly valved for varying the rate of flow of the fluid into the exhaust jet, thereby eliminating difficult valving problems.

It is another object of the invention to generate hot gas closely adjacent to the injection point in the nozzle and thereby eliminate large conduits which would otherwise add weight to the thrust vector control system.

These and other objects of the present invention are achieved by the use of auxiliary hybrid rocket motors mounted adjacent the expansion nozzle of the main rocket motor. As is known, a hybrid rocket motor comprises a solid propellant component loaded within the motor case and a liquid propellant component which is injected into the case from an external source for supporting combustion in the case. By appropriate valving of the liquid injectant, the combustion in the case may be started, modulated, stopped, or restarted. Thus, the hybrid rocket motor provides hot secondary fluid which can be injected into the main nozzle at a controlled rate to deflect the exhaust jet. By use of the hybrid rocket motor, it will be noted that the flow rate of the hot gas can be controlled without direct valving of the hot gas. All valving necessary for controlled secondary fluid injection is done on the liquid component at the relatively cool head end of the hybrid motor, an operation which is readily accomplished.

By appropriate design, the present hybrid motor can be made to produce secondary fluid at a wide range of temperatures. Although the gases from the hybrid motor can be relatively cool, gases having temperatures of approximately 5000° F. and above are preferred so that maximum deflection of the jet exhaust is produced for a given mass flow. Also, in the preferred practice of the present invention, a combination of liquid and solid propellants that is hypergolic, or spontaneously ignitable upon contact, is utilized. An example of such propellant combination is described in copending application No. 174,579, filed February 20, 1962 and assigned to the same assignee as the present application. The propellants described therein comprise nitrogen tetroxide as the liquid oxidizer and a solid grain consisting of a high content of acetyl ferrocene in a binder made of polybutadiene and acrylic acid. However, a propellant combination that requires an igniter and subsequently cannot be reduced below a minimum flow level without extinction of combustion may also be employed.

The hot gases from the present hybrid motor are injected into the divergent portion of the main nozzle through various injection means. In one case, the nozzle of the hybrid motor, which may be either a convergent or a convergent-divergent nozzle, may be attached directly to the main nozzle wall and be in direct communication with the nozzle interior. In this case, there will be a single opening in the nozzle wall for each hybrid motor and the opening will be relatively large. In other applications, it may be desirable that the hot gases be introduced into the main nozzle through a slot, a series of small openings, or a porous wall section. In these applications, the openings may extend radially or axially of the main nozzle or may be in a random pattern, as in the case of the porous wall section. The latter is made of powdered metal which has been molded and sintered, leaving pores or interstices whose diameters are preferably less than the thickness of the boundary layer of the main exhaust gases so as to minimize the possibility of flow of the exhaust gases into the auxiliary motors when they are inoperative. Minimal discharge of the hybrid motors would also accomplish the same result for the other types of openings. The choice as to which injection means should be used for a particular rocket motor will be dependent upon such factors as cost, nozzle design, speed of response desired, types of propellants used, and temperature of the hot gases.

The present thrust vector control apparatus may be used in association with liquid bi-propellant motors, liquid monopropellant motors, solid propellant motors, or hybrid propellant motors. In certain of these motors, there are additional features of the present invention worthy of mention. For example, in the case of a solid propellant motor, the exhaust gases generally carry incompletely oxidized fuel components. Where such motors are large, additional thrust vector deflection may be obtained by injecting liquid oxidizer into the auxiliary hybrid rocket motors in excess of that required to sustain combustion. The excess oxidizer will react with the incompletely oxidized fuel components in the primary exhaust gases and create a localized high pressure area which will help to deflect the thrust vector. In the case of a hybrid rocket motor, a portion of the liquid component for the main combustion chamber may also be used for injection into the auxiliary hybrid motors, thereby eliminating separate pressurization means and storage tanks for the thrust vector control apparatus.

These and other features of the present invention will be more readily apparent from the following detailed description of typical embodiments of the invention taken in conjunction with the accompanying drawings in which:

FIGURE 1 is a schematic elevational view, partly in section, showing one embodiment of the present directional control means;

FIGURE 2 is a schematic end view taken along the line 2—2 of FIGURE 1;

FIGURE 3 is a schematic elevational view, partly in section, showing another embodiment of the present directional control means, said means utilizing chamber gas for pressurizing the liquid propellant component;

FIGURE 4 is a fragmentary, enlarged view showing porous injection means for the secondary fluid; and FIGURE 5 is a schematic elevational view, partly in section, showing the present directional control means in combination with a typical hybrid rocket motor.

In FIGURE 1, the present directional control apparatus is shown in conjunction with a solid propellant rocket motor, generally designated as 10. Motor 10, shown in fragment, has a combustion chamber 12 loaded with a centrally perforated solid propellant grain 13 and a convergent-divergent nozzle 14 through which the combustion gases are discharged to provide thrust for the rocket vehicle. Nozzle 14 has a convergent portion 16, a throat 18, and an expansion portion 20. Mounted exteriorly of the nozzle 14 are diametrically opposed auxiliary hybrid rocket motors 22 containing a solid propellant component 24. Rocket motors 22 have convergent nozzles 26 which are attached to the nozzle wall in the expansion portion 20 of the main nozzle and which are in direct communication with the nozzle interior. Motors 22 are connected through conduits 28 to a toroidal tank 30 containing a liquid propellant component which is hypergolic with solid propellant 24. Tank 30 is pressurized by high pressure gas flowing from tank 32 through pressure regulator 34. Other pressurization means such as a turbo-pump or a metering pump (not shown) may also be used for injecting the liquid propellant component. Where the rocket vehicle may be subject in maneuvering to abrupt changes in direction, tank 30 may be provided with a flexible barrier member 35 which separates the high pressure gas and the liquid propellant component, thereby preventing sloshing and entrapping of the gas in the liquid propellant.

In the operation of the present directional control apparatus, the flow of the liquid propellant component to each of the motors 22 is controlled by valves 36 of the servo type which are connected to the rocket guidance system (not shown). Since the liquid component and solid component 24 are hypergolic, they ignite immediately on contact and generate hot gases which discharge through nozzle 26 into the main nozzle 14. It will be apparent that by appropriate action of valves 36, the generation and injection of the hot gases from each motor can be varied from zero or near zero flow to maximum flow, as required for thrust vector control.

The mechanism for deflection of the exhaust jet in nozzle 14 by the injection of a secondary fluid is generally explained by the shock-wave phenomenon. Since the flow of the exhaust gases in expansion portion 20 is supersonic, the injection of hot gases creates a shock wave or waves, depending upon the injection means used. This sets up unsymmetrical pressure forces, schematically shown in FIGURE 1, which produce a net side force on the nozzle wall downstream of the injection point. This force creates a turning moment about the center of gravity of the rocket vehicle. Where the exhaust gases in the main nozzle contain incompletely oxidized fuel components and where their residence time in the nozzle is sufficient, these components may be further oxidized by using an oxygen-rich discharge from the auxiliary hybrid motors. This further combustion creates a localized high pressure area which also augments the turning moment.

The embodiment shown in FIGURE 3 is generally similar to that shown in FIGURES 1 and 2 with the following exceptions. Instead of the high pressure gas tank 32 in FIGURE 1, the liquid propellant component tank 30 is pressurized by combustion chamber gas flowing through conduit 38 to tank 30. Here, conduit 38 is of relatively short length and diameter and requires little or no insulation, for it conducts only the limited amount of gas of limited heat content required for the pressurization. Where an elastomeric barrier member 35 is used in tank 30, there may be some initial ablation of the member due to the high temperature of the chamber gas. However, with the creation of a gas layer over the barrier member, further ablation is prevented. Where no barrier member is provided, there will be some initial heating of the liquid propellant component, but the heating will not be of such degree as to cause vaporization of a significant portion of the liquid propellant component since the relative mass of the liquid component is quite large in comparison to the mass of the chamber gas in conduit 38 which is in contact with the liquid propellant. By utilizing the chamber gas as the pressurizing means, a separate pressurizing system such as a high pressure gas source or pump means is eliminated, thereby decreasing the total weight of the thrust vector control apparatus.

Motors 22 in FIGURE 3 are also shown with convergent-divergent nozzles 40 which are in direct communication with the interior of nozzle 14. However, it will be apparent that other types of injection means previously described may be used here and also in the embodiment shown in FIGURES 1 and 2. FIGURE 4, for example, shows a motor with a convergent nozzle which is attached to a porous wall section 40 of the type previously described. The porous wall mode of injection may not be as effective in creating shock waves as the other injection means with relatively large openings. However, it produces a thrust vector control force, nevertheless, by inducing separation of the jet exhaust from the nozzle wall.

FIGURE 5 shows the present directional control apparatus used in combination with a typical hybrid rocket motor 50 having a propellant grain 52 and a pressurized tank 54 containing a fluid component 56. Component 56 is injected into the motor chamber 58 through suitable injector means 60 and valve means 62 to sustain combustion of the propellant grain 52. In this embodiment a portion of the fluid component 56 is also fed from the tank 54 into the auxiliary hybrid rocket motors 22 through conduits 64, 66 to provide the combustion sustaining fluid component for these auxiliary motors. As previously mentioned, this embodiment eliminates the use of separate pressurization means and storage tank for the thrust control apparatus.

While the present invention has been described in conjunction with directional control along only one axis of the rocket vehicle, it will be apparent that a plurality of the apparatus above described can be used to obtain control in the other axes. Also, instead of single motors in opposing relationship, a number of smaller motors may be substituted at a given location on the main nozzle. These and other modifications will be obvious to those skilled in the art. It will thus be understood that the scope of the present invention is to be limited only by the appended claims.

I claim:

1. In a rocket motor having a convergent-divergent nozzle, thrust vector control apparatus comprising: auxiliary hybrid rocket motors disposed adjacent to the nozzle, said motors being loaded with a solid propellant component and fed with a liquid propellant component; passage means in the divergent wall of the nozzle for injecting hot gas from the auxiliary motors into the primary exhaust gas; valve means for selectively introducing and regulating the flow of the liquid propellant component to the auxiliary motors, thereby controlling the rate of hot gas injection into the nozzle so as to produce the desired deflection of the thrust vector; and wherein the passage means comprise porous sections having pores of such diameters as to minimize the possibility of flow of the primary exhaust gas into the auxiliary motors when they are inoperative.

2. In a hybride rocket motor having a solid propellant component in the case, a sustaining liquid propellant component, and a convergent-divergent nozzle; thrust vector control apparatus comprising: auxiliary hybrid rocket motors disposed adjacent to the nozzle, said motors being loaded with a solid propellant component and being fed with a bleed of the liquid propellant component for the primary motor; passage means in the divergent wall of the nozzle for injecting hot gas from the auxiliary motors into the primary exhaust gas; and valve means for selectively introducing and regulating the flow of the liquid propellant component to the auxiliary motors, thereby controlling the rate of hot gas injection into the nozzle so as to produce the desired thrust vector deflection.

References Cited by the Examiner

UNITED STATES PATENTS

| | | | |
|---|---|---|---|
| 2,405,785 | 8/1946 | Goddard | 60—35.6 X |
| 2,943,821 | 7/1960 | Wetherbee | 60—35.6 X |
| 3,010,280 | 11/1961 | Hausmann | 60—35.6 |
| 3,065,596 | 11/1962 | Schultz | 60—35.6 X |
| 3,065,597 | 11/1962 | Adamson et al. | 60—35.6 X |
| 3,066,485 | 12/1962 | Bertin et al. | 60—35.6 X |
| 3,070,957 | 1/1963 | McCorkle | 60—35.6 X |
| 3,134,225 | 5/1964 | Pennington | 60—35.54 |

OTHER REFERENCES

Navord Report No. 6548, Thrust-Vectoring Experiments With Gas Injection, by L. T. Bankston and H. M. Larsen; reproduced by ASTIA, Arlington Hall Station, Arlington 12, Va., AD 233077; unclassified March 3, 1960; pages 7, 14 and 22 relied on.

Hybrid Propulsion Systems, Astronautics Magazine, October 1959, pages 42–44 relied on.

MARK NEWMAN, *Primary Examiner.*

SAMUEL LEVINE, BENJAMIN A. BORCHELT,
*Examiners.*

W. A. SCHUETZ, G. H. GLANZMAN,
*Assistant Examiners.*